United States Patent
Chiu et al.

(10) Patent No.: US 7,167,722 B2
(45) Date of Patent: Jan. 23, 2007

(54) WIRELESS TRANSMISSION MODULE AND METHOD THEREOF AND PERIPHERAL INPUT DEVICE OF WIRELESS DATA PROCESSING DEVICE USING THE MODULE/METHOD

(75) Inventors: Alex Chiu, Taipei (TW); Chris Chuang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 121 days.

(21) Appl. No.: 10/986,899

(22) Filed: Nov. 15, 2004

(65) Prior Publication Data
US 2005/0272467 A1 Dec. 8, 2005

(30) Foreign Application Priority Data
Jun. 8, 2004 (TW) .............................. 93116421 A

(51) Int. Cl.
*H04M 1/00* (2006.01)

(52) U.S. Cl. ................... 455/553.1; 455/552.1; 455/179.1; 455/103; 455/41.2; 398/115; 398/116

(58) Field of Classification Search ................ 455/103, 455/88, 179.1, 553.1, 552.1, 41.2; 398/115, 398/116
See application file for complete search history.

(56) References Cited

U.S. PATENT DOCUMENTS

| | | |
|---|---|---|
| 6,763,195 B1 * | 7/2004 | Willebrand et al. .......... 398/115 |
| 6,904,266 B1 * | 6/2005 | Jin et al. ....................... 455/20 |
| 2004/0192222 A1 * | 9/2004 | Vaisanen et al. .............. 455/78 |
| 2005/0020212 A1 * | 1/2005 | Hiramitsu et al. ......... 455/41.2 |
| 2005/0064824 A1 * | 3/2005 | Bergervoet et al. ......... 455/101 |
| 2005/0075077 A1 * | 4/2005 | Mach et al. ............. 455/67.13 |
| 2005/0227650 A1 * | 10/2005 | Williams .................. 455/179.1 |

* cited by examiner

*Primary Examiner*—Danh Le
(74) *Attorney, Agent, or Firm*—Rabin & Berdo, P.C.

(57) ABSTRACT

A wireless transmission module comprises: a first transceiver used to broadcast and to receive signals in a first frequency band; a second transceiver used to broadcast and to receive signals in a second frequency band; a switching circuit used to provide a single path of transmission and to control the its switches between the first transceiver and the second transceiver; and a processing unit used to control the switching circuit to switch the path of transmission from the first transceiver to the second transceiver when using the first frequency band of signal to communicate with a wireless device is not possible.

14 Claims, 6 Drawing Sheets

WIRELESS TRANSMISSION MODULE AND METHOD THEREOF AND PERIPHERAL INPUT DEVICE OF WIRELESS DATA PROCESSING DEVICE USING THE MODULE/METHOD

BACKGROUND OF THE INVENTION

1. Field of Invention

The invention relates to a wireless peripheral input device of a data processing device, a wireless transmission module and the method thereof. In particular, the invention relates to a wireless transmission module, the method thereof, and a wireless peripheral input device of a data processing device using the module/method.

2. Related Art

The current wireless network transmission technology can be divided into the wireless wide area network (WWAN), such as the Global System for Mobile Communications (GSM); the wireless local area network (WLAN), such as 802.11 and related standards of the Institute of Electrical and Electronic Engineers (IEEE); and the wireless personal area network (WPAN), such as the Bluetooth or the 27 MHz radio frequency (RF) technologies.

The name of WPAN suggests that it is a wireless network technology used within personal activity range. The primary purpose of this type of technologies is to enable personal data processing devices, such as cell phones, PDA's, computers, to communicate, exchanging data.

The wireless keyboards or mice on the market also belong to this category. For example, there are wireless keyboards or mice that use the 27 MHz RF technology or the Bluetooth technology to exchange data with computers. Since the wireless technology has the advantages of a stronger penetration through physical obstacles, a longer communication distance, and omni-directional emissions, they have become the most commonly used standards for wireless keyboards or mice on the market.

Nevertheless, the conventional wireless keyboards or mice using the Bluetooth technology cannot be used immediately when the computer is turned on or in the DOS mode without booting up the Windows first. That is, one cannot perform their related settings in the BIOS when the system does not recognize the keyboard or mouse. Moreover, the wireless keyboard or mouse will be unavailable if the Bluetooth transmission is interfered with other signals.

On the other hand, although the wireless keyboards and mice using the 27 MHz RF technology to exchange data with the computer are cheaper, they are not compatible with Bluetooth devices. Moreover, their transmission distances are a lot shorter in order to avoid interference and to fix the transmission ID.

In view of the problems existing in the prior art, it is highly desirable to provide a technology for Bluetooth wireless keyboards, mice, and other related devices to integrate the 27 MHz RF technology so that they have the advantages of both the Bluetooth and 27 MHz RF technologies and avoid the problems thereof. For example, it will be possible to perform settings in the BIOS using the keyboards or mice even before entering the DOS or Windows mode. Furthermore, when the Bluetooth transmission is not available, the system can switch to the 27 MHz RF technology for data transmissions. In this case, the keyboard or mouse will have a comprehensive wireless transmission method.

SUMMARY OF THE INVENTION

A primary objective of the invention is to provide a wireless transmission module, the method thereof, and a wireless peripheral input device of a wireless data processing device using the module/method so that a comprehensive wireless transmission means exists among the wireless peripheral input device, the wireless data processing device, and other information devices.

A primary feature of the invention is to provide a wireless transmission module, the method thereof, and a wireless peripheral input device of a wireless data processing device using the module/method so that the wireless data processing device automatically switches to use signals in a second frequency band when its wireless peripheral input device cannot communicate with the data processing device or other information devices using signals in a first frequency band.

Another objective of the invention is to provide a wireless transmission module, the method thereof, and a wireless peripheral input device of a wireless data processing device using the module/method so that wireless transmissions are available between the wireless peripheral input device and the data processing device before the data processing device enter the DOS or Windows mode, i.e., before the Bluetooth function is initiated.

A further objective of the invention is to provide a wireless transmission module, the method thereof, and a wireless peripheral input device of a wireless data processing device using the module/method so that when the wireless data processing device and its wireless peripheral input device cannot communicate using the Bluetooth technology, it can automatically switch to the RF transmission mode.

To achieve the above objectives, a wireless transmission module of the invention contains a first transceiver used to broadcast and to receive signals in a first frequency band; a second transceiver used to broadcast and to receive signals in a second frequency band; a switching circuit used to provide a single path of transmission and to control the its switches between the first transceiver and the second transceiver; and a processing unit used to control the switching circuit to switch the path of transmission from the first transceiver to the second transceiver when using the first frequency band of signal to communicate with a wireless device is not possible.

The wireless transmission module can further contain a Bluetooth signal detecting unit to detect wireless signals emitted by the first transceiver in the first frequency band and to notify the processing unit when the detect wireless signal is less than a predetermined value.

A wireless peripheral input device of a data processing unit according to the invention contains:

a peripheral input device, which contains arrayed keys to generate a corresponding signal for each of the keys or a track ball to generate a corresponding signal for each action; and a wireless transmission module, which is coupled to the input device, for transmitting each signal in a wireless means, and a data processing device, where the wireless transmission module contains:

a first transceiver used to broadcast and to receive signals in a first frequency band;

a second transceiver used to broadcast and to receive signals in a second frequency band;

a switching circuit used to provide a single path of transmission and to control the its switches between the first transceiver and the second transceiver; and a processing unit used to control the switching circuit to switch the path of transmission from the first transceiver to the second transceiver when using the first frequency band of signal to communicate with a wireless device is not possible.

The wireless transmission module can further contain a Bluetooth signal detecting unit to detect wireless signals emitted by the first transceiver in the first frequency band and to notify the processing unit when the detect wireless signal is smaller than a predetermined value.

The wireless peripheral input device can be a wireless keyboard or mouse.

To achieve the above-mentioned objectives, a wireless data processing device of the invention contains:

a peripheral input device of a data processing device with a first wireless transmission module, the first wireless transmission module comprising:

a first transceiver used to broadcast and to receive signals in a first frequency band;

a second transceiver used to broadcast and to receive signals in a second frequency band;

a switching circuit used to provide a single path of transmission and to control the its switches between the first transceiver and the second transceiver; and a data processing device with a second wireless transmission module, the first wireless transmission module comprising:

a first transceiver used to broadcast and to receive signals in a first frequency band;

a second transceiver used to broadcast and to receive signals in a second frequency band; and a signal detecting unit to detect wireless signals emitted by the first transceiver in the first frequency band and to notify the processing unit when the detect wireless signal is smaller than a predetermined value.

To achieve the above-mentioned objectives, a wireless transmission method disclosed herein is provided for wireless data transmissions between a wireless transmission module of a wireless peripheral input device and a data processing device thereof. The wireless transmission method contains the steps of:

initiating a wireless signal transmission in a first frequency band between the wireless transmission module and the data processing device;

returning a response signal when the wireless signal in the first frequency band is smaller than a predetermined value;

generating a cutting signal according to the response signal; and switching the wireless signal transmission in the first frequency band to a wireless signal transmission in the second frequency band according to the cutting signal.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
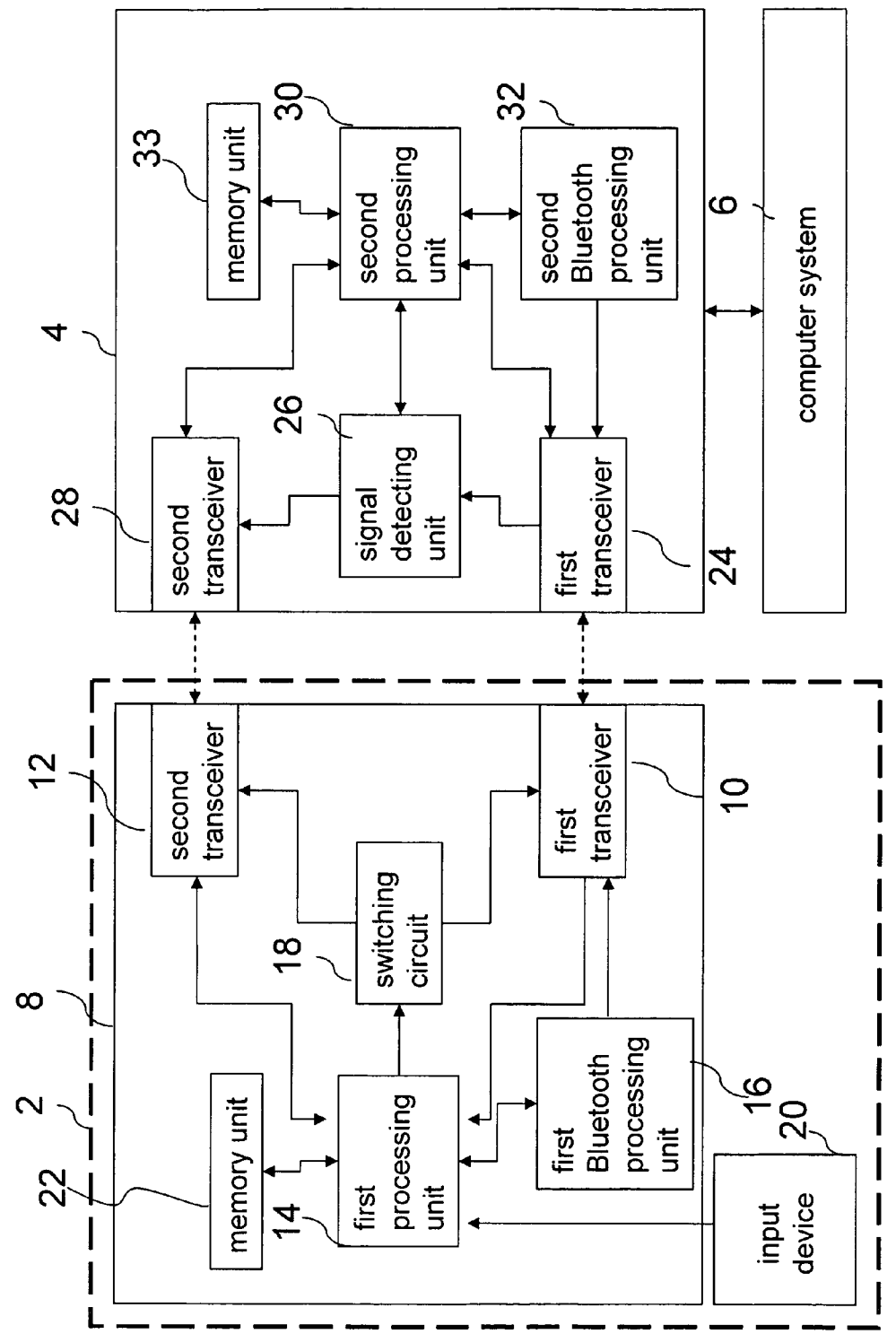
FIG. 1 is a system structure that uses a preferred embodiment of the invention.

With reference to FIG. 1, a system structure according to a preferred embodiment of the invention includes a first wireless transmission module 8, a wireless peripheral input device 2 of a data processing device (such as a wireless keyboard or mouse) in the first wireless transmission module 8, and a data processing device 6 connected to a second wireless transmission module 4 for wireless data exchanges with the wireless peripheral input device 2.

In FIG. 1, the wireless peripheral input device 2 of the data processing device, such as a wireless keyboard, contains an input device 20 and the coupled first wireless transmission module 8. The input device 20 can be arrayed keys. The data processing device 6 is connected to a second wireless transmission module 4 associated with the first wireless transmission module 8. Therefore, the wireless keyboard can exchange data with the data processing device 6 via the first wireless transmission module 8 and the second wireless transmission module 4.

The invention is characterized by in its first wireless transmission module 8 and the associated second wireless transmission module 4. They have two different wireless transmission methods. One is the wireless signal transmission in a first frequency band and the other is the wireless signal transmission in a second frequency band. Each of the wireless signal transmissions in the first and second frequency can be either the Bluetooth transmission or the 27 MHz RF transmission. Therefore, a device using the wireless transmission module can still use the wireless signals in the second frequency band, such as the 27 MHz RF signals, for data transmissions when those in the first frequency band, such as the Bluetooth transmission cannot function normally. Thus, the disclosed device has comprehensive transmissions.

In the following, we use a wireless keyboard 2 with the first wireless transmission module 8 and a data processing device with the second wireless transmission module 4 to describe the invention.

Figure 2:
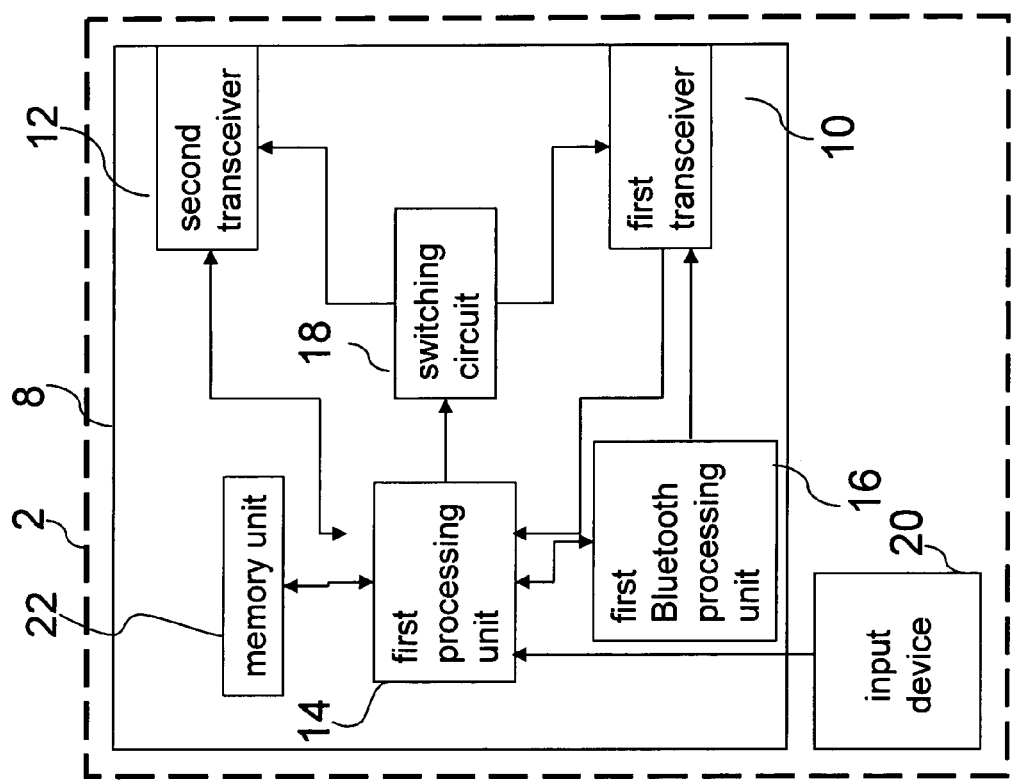
FIG. 2 is the device structure of a preferred embodiment using the disclosed wireless transmission module in FIG. 1.

In FIG. 2, we use a wireless keyboard as an example. However, any person skilled in the art should understand that all possible variations of the example are within the scope of the invention.

As shown in the drawing, the wireless peripheral input device 2 (a wireless keyboard in this embodiment) of a data processing device with the disclosed wireless transmission module 8 contains: a first transceiver 10, a second transceiver 12, a first processing unit 14, a switching circuit 18, an input device 20, and a memory unit 22.

The first transceiver 10 is used to broadcast and to receive wireless signals in a first frequency band, such as the Bluetooth or 27 MHz RF signals, providing a path of transmission between the wireless keyboard and the computer system or other devices with the same first transceiver 10. In particular, a first wireless signal transmission RF circuit (not shown) is used to covert a key signal from the input device 20 into a first wireless signal transmission RF signal for output, or to convert a to received first wireless signal into a signal recognizable by the first processing unit 14. It performs the amplification or impedance matching for the RF signals and provides a path for transmitting the first wireless signals.

The second transceiver 12 is used to broadcast and to receive wireless signals in the second frequency band, such as the Bluetooth or 27 MHz RF signals, providing another path of transmission between the wireless keyboard and the computer system or other devices with the same first transceiver 10. In particular, a second wireless signal transmission RF circuit (not shown) is used to covert a key signal from the input device 20 into a second wireless signal transmission RF signal for output, or to convert a received second wireless signal into a signal recognizable by the first processing unit 14. It performs the amplification or impedance matching for the RF signals and provides a path for transmitting the second wireless signals.

The switching circuit 18 is used to switch and provide a path of transmission. When a received wireless signal in the first frequency is smaller than a predetermined threshold, the wireless signal transmission path of the first frequency path is shut down. Instead, the wireless signal transmission in the second frequency band is turned on. Alternatively, when a received wireless signal in the first frequency is greater than a predetermined threshold, the wireless signal transmission path of the second frequency path is shut down. Instead, the wireless signal transmission in the first frequency band is turned on.

If the first transceiver 10 is a Bluetooth transceiver, it will contain a first Bluetooth processing unit 16 as shown in the drawing. The first Bluetooth processing unit 16 processes the data packaging and initiation of the first transceiver 10 in order to convert the data packets into Bluetooth signals. It also converts received Bluetooth signals into signals recognizable by the first processing unit 14.

The first processing unit 14 is used to receive response signals from a signal receiving terminal (the second wireless transmission module 4 in the drawing). According to the strength of the wireless signal in the first frequency, the first processing unit 14 controls the switching circuit 18 to switch between the signal transmission path in the first frequency band and that in the second frequency band. For example, if the received response signal is smaller than a predetermined threshold, a cutting signal is sent out to the switching circuit 18, turning off the signal transmission path in the first frequency band and turning on that in the second frequency band. On the other hand, if the received response signal is greater than the predetermined threshold, the switching circuit 18 is commanded to turn on the signal transmission path in the first frequency band and turn off that in the second frequency band. Besides, the first processing unit 14 is also used to receive the key signals from the input device 20 and transmit the signals to the first transceiver 10. The signals are then converted into wireless RF signals in the first frequency band for emission. Alternatively, the signals can be transmitted to the first Bluetooth processing unit 16, which converts the signals into Bluetooth signals for the second transceiver 12 to broadcast.

The input device 20 can be arrayed keys (or the keys and track ball on a wireless mouse). A key code is generated for each key strike and sent via the first processing unit 14 in a wireless means to the computer system 6.

The memory unit 22 is used to store the Bluetooth address of the device, such as the ID's of the first transceiver 10 and the second transceiver 12.

Beside, the invention also contains a power supply unit (not shown in the drawing) for providing the power needed by the circuit.

According to the description above, the disclosed device can automatically switch from the wireless signal transmission mode in the first frequency band to that in the second frequency band according to the strength of the wireless signals in the first frequency band. Therefore, the device can maintain good wireless transmissions at all times.

Figure 3:
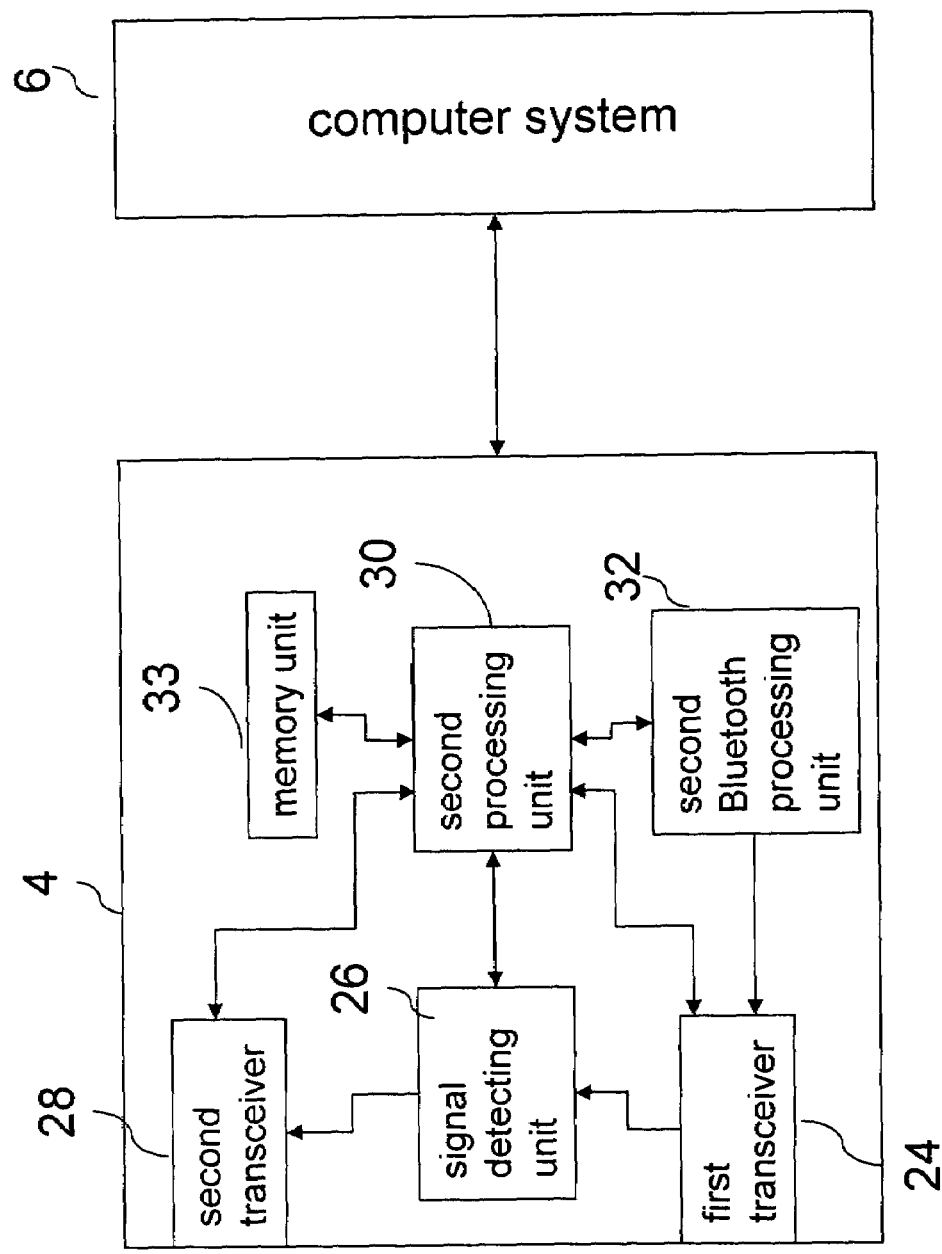
FIG. 3 is the system structure of a preferred embodiment using the disclosed wireless transmission module in FIG. 1.

FIG. 3 shows a system structure of a preferred embodiment using the disclosed wireless transmission module 4 in FIG. 1. In this embodiment, the wireless transmission module 4 is connected to a computer system for providing the wireless transmission function of the computer system. Although the wireless transmission module 4 is connected to a computer system here, any person skilled in the art should understand that all kinds of obvious variations of the embodiment are within the scope of the invention.

In FIG. 3, the system contains the second wireless transmission module 4 shown in FIG. 1 and a computer system 6 connected to the second wireless transmission module 4.

The second wireless transmission module 4 also contains a first transceiver 24, a second transceiver 28, a second processing unit 30, and a signal detecting unit 26.

The first transceiver 24 is used to broadcast and to receive wireless signals in a first frequency band, such as the Bluetooth or 27 MHz RF signals, providing a path of transmission between the second wireless transmission module 4 and other devices with the same first transceiver 24. In particular, a first wireless signal transmission RF circuit (not shown) is used to covert a wireless transmission signal from a device with the same first transceiver into a signal recognizable by the second processing unit 30. It performs the amplification or impedance matching for the signal to be processed by the second processing unit 30 or converts a signal from the second processing unit 30 into a first wireless RF signal for output.

The second transceiver 28 is used to broadcast and to receive wireless signals in a second frequency band, providing another path of transmission between the second wireless transmission module 4 and other devices with the same second transceiver 28. In particular, a second wireless signal transmission RF circuit (not shown) is used to covert a wireless transmission signal from a device with the same second transceiver into a signal recognizable by the second processing unit 30. It performs the amplification or impedance matching for the signal to be processed by the second processing unit 30 or converts a signal from the second processing unit 30 into a first wireless RF signal for output.

If the first transceiver 24 is a Bluetooth transceiver, it will contain a second Bluetooth processing unit 30 as shown in the drawing. The second Bluetooth processing unit 30 processes the data packaging and initiation of the first transceiver 24 in order to convert the data packets into Bluetooth signals. It also converts received Bluetooth signals into signals recognizable by the second processing unit 30.

The signal detecting unit 26 is used to continuously detect a signal received by the first transceiver 24 and to check whether the signal value is smaller than a predetermined threshold. When the signal value is smaller than the predetermined threshold, the detecting unit sends out a response signal to the first wireless transmission module 8, so that the transmission function of the second transceiver 12 is initiated when the first processing unit 14 receives the signal. On the other hand, if the signal value is not smaller than the predetermined threshold, the detecting unit does not send out a response signal to the first wireless transmission module 8. The first wireless transmission module 8 thus keeps using the first transceiver 10 while keeping the second transceiver 12 off. The signal's predetermined threshold can be set by the manufacturer according to the need or by the user. The detecting unit 26 may further contain a timing unit (not shown) to control the number of detection times in a unit time.

The second processing unit 30 is used to receive a recognizable signal from the second transceiver 28 or the first transceiver 24, and to make a corresponding reaction according to the received signal. It further controls the signal detecting unit 26, detecting whether the signal received by the first transceiver 24 is smaller than the predetermined threshold and determining whether to send a response signal to the first transceiver 8.

From the above description of the second wireless transmission module 4 of wireless transmissions, one should realize that a response signal is sent to the first wireless transmission module 8 when the signal received by the first transceiver 24 is detected by the signal detecting unit to be less than a predetermined threshold. The first wireless transmission module 8 thus switches from the wireless transmission in the first frequency band to that in the second frequency band, so that the wireless peripheral input device of the data processing device, e.g. a wireless keyboard 2, can maintain normal wireless data transmissions with the computer system 6.

Figure 4:
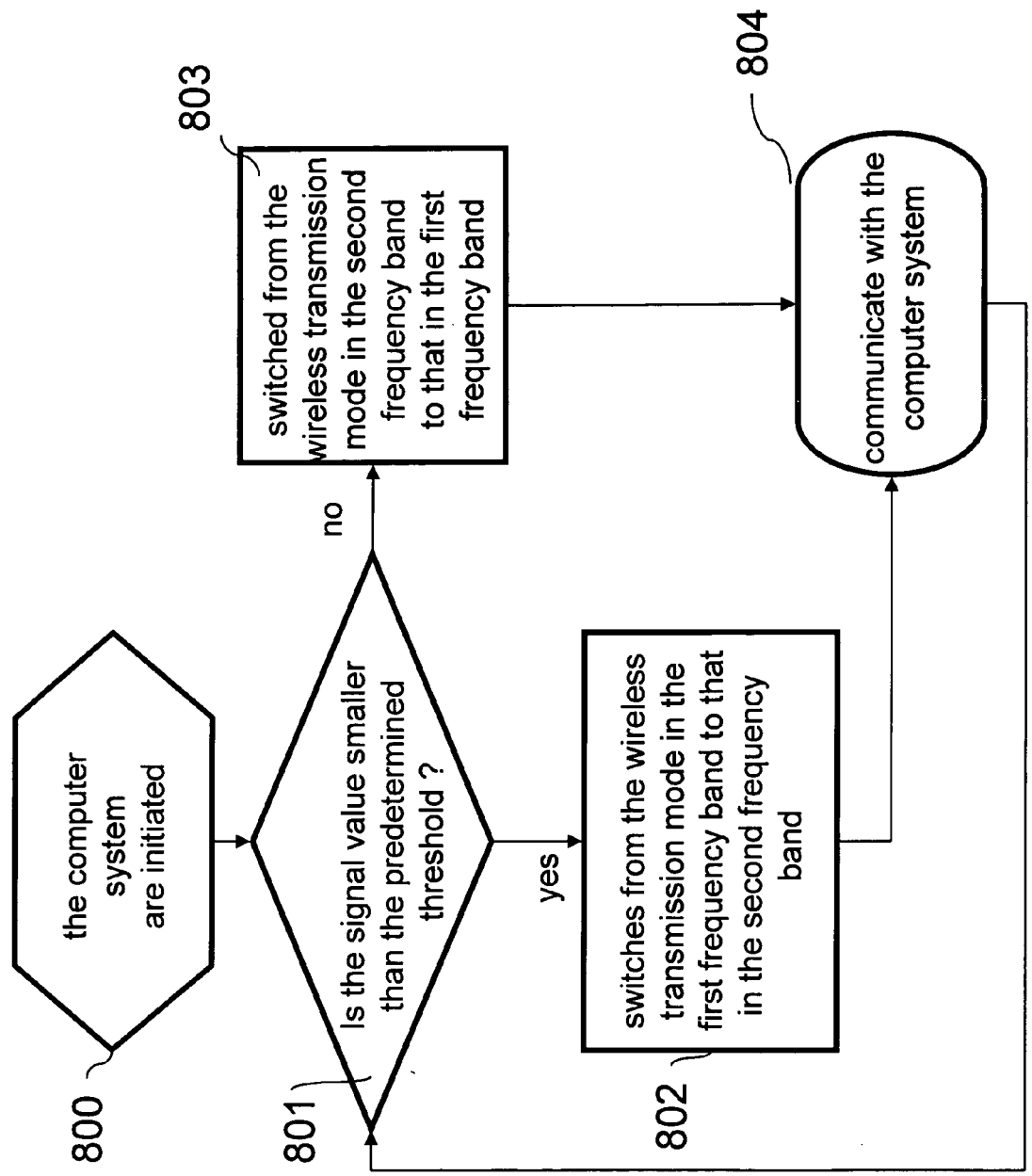
FIG. 4 is a flowchart of a preferred embodiment method.

Please refer to FIG. 4 along with FIG. 1 for a preferred transmission method between the first wireless transmission module 8 and the second wireless transmission module 4 constructed as described above. FIG. 4 is a flowchart of the method. In FIG. 1, the first wireless transmission module 8 is applied to a wireless keyboard, while the second wireless transmission module 4 is in a computer system.

When the wireless keyboard and the computer system 6 are initiated in the DOS or BIOS mode (step 800), the second processing unit 30 starts the signal detecting unit 26 to check whether a received signal (the first frequency band transmission signal of the wireless keyboard 2) is smaller than a predetermined threshold (step 801). If the signal value is smaller than the predetermined threshold, the detecting unit 26 sends out a response signal to the wireless keyboard 2. When the first processing unit 14 receives the response signal, it controls the switching circuit 18 to shut down the first transceiver 02 and initiate the second transceiver 12. The wireless keyboard 2 thus switches from the wireless transmission mode in the first frequency band to that in the second frequency band (step 802). The wireless keyboard 2 can thus use the second transceiver 12 and the second transceiver 28 in the second wireless transmission module 4 to communicate with the computer system 6 (step 804).

If during the continuous detection process of the detecting unit (e.g. once the wireless transmission mode in the second frequency band starts, the system has entered the Windows OS, and the Bluetooth function of the wireless keyboard 2 and the computer 6 has been initiated) the wireless signal in the first frequency band from the wireless keyboard 2 is greater than the predetermined threshold, a recovery signal is sent to the wireless keyboard 2. Once the first processing unit 4 receives the recovery signal, it controls the switching circuit 18 to turn on the first transceiver 10 and shut off the second transceiver 12. The wireless keyboard 2 is thus switched from the wireless transmission mode in the second frequency band to that in the first frequency band (step 803). The wireless keyboard 2 thus uses the first transceiver 10 and the first transceiver 24 of the second wireless transmission module 4 to communicate with the computer system 6 (step 804).

Figure 5:
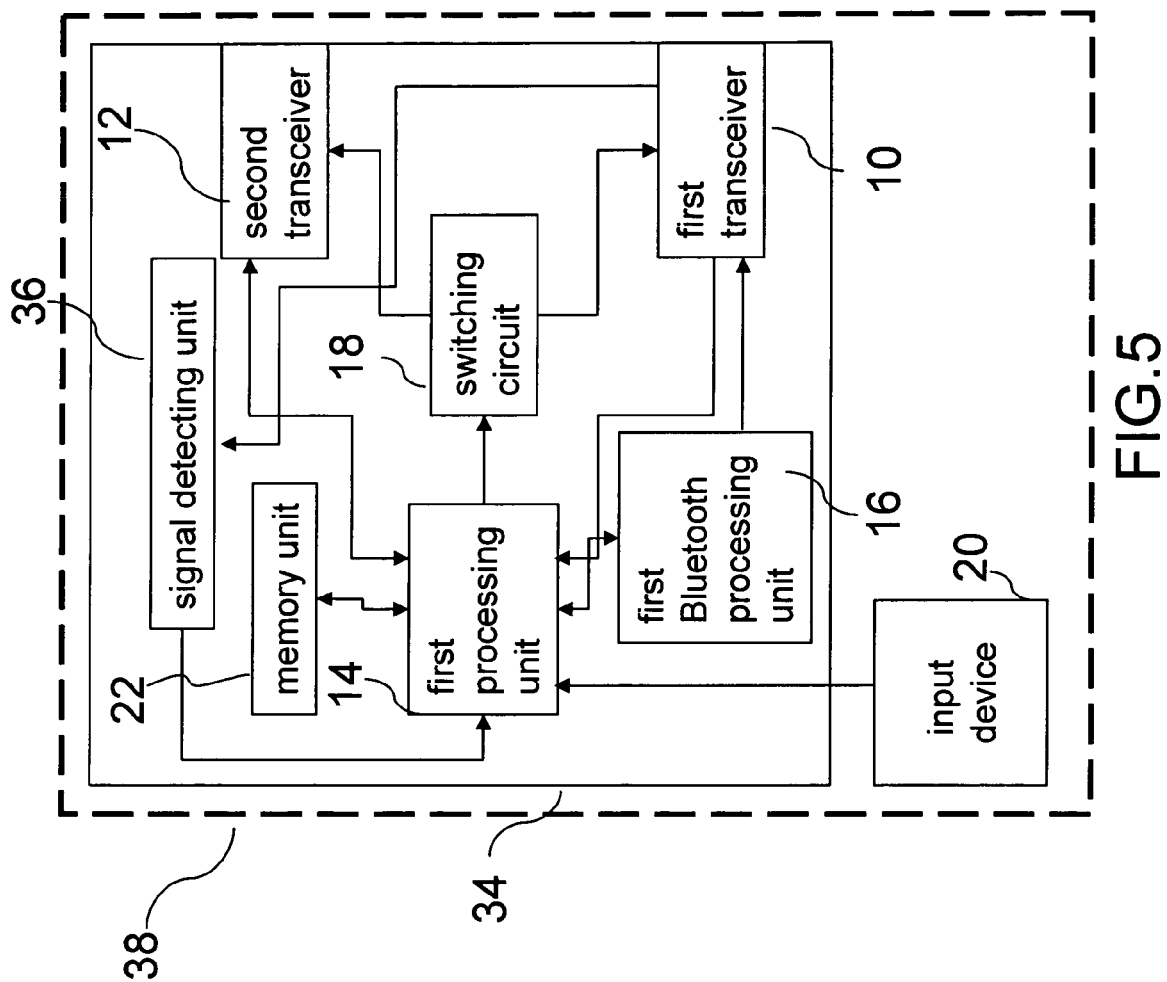
FIG. 5 is the device structure of another preferred embodiment using the disclosed wireless transmission module.

FIG. 5 shows the device structure of another embodiment of the disclosed wireless transmission module 34. As shown in the drawing, the computer peripheral input device 38 contains a signal detecting unit 36 in addition to those components in FIG. 1. It is used to continuously detect the Bluetooth signal from other devices that are installed with the disclosed wireless transmission module, checking whether the wireless signal in the first frequency is smaller than a predetermined threshold. Once the signal is confirmed to be smaller than the predetermined threshold, the detecting unit 36 sends out a response signal to the other devices installed with the disclosed wireless transmission module. Once the processing unit of the device receives the signal, the transmission function of its second transceiver is started. On the other hand, if the signal value is not smaller than the predetermined threshold, the detecting unit 36 does not send out a response signal to the other device. The devices still use the wireless signal in the first frequency band as their data transmission means. The above-mentioned transmission switching mechanism is exactly the same as those described in FIG. 4. The signal's predetermined threshold can be set by the manufacturer according to the need or by the user. The detecting unit 36 may further contain a timing unit (not shown) to control the number of detection times in a unit time.

Moreover, the computer peripheral input device 38 contains a signal detecting unit 36 in addition to those components in FIG. 1. It is used to automatically detect whether the wireless signal in the first frequency band sent by the device 38 is smaller than a predetermined threshold. Once the signal is confirmed to be smaller than the predetermined threshold, the detecting unit 36 sends out a response signal to its processing unit 14. After the processing unit 14 of the computer peripheral input device 38 receives the signal, it generates a cutting signal to cut the transmission function of wireless signals in the first frequency band and to start the transmission function of the second transceiver. If the signal is never smaller than the predetermined threshold, the detecting unit 36 does not send out a response signal to its processing unit 14. Thus, the devices installed with the disclosed wireless transmission modules keep using the wireless transmission in the first frequency band as the data transmission method.

The above-mentioned wireless transmission module can be coupled to an input device, such as a mouse or keyboard, forming a wireless mouse of keyboard. The first transceiver is a Bluetooth transceiver. When the wireless transmission module of the detecting unit is coupled to the computer system, the user can still use the wireless transmission in the second frequency band (e.g. the 27 MHz RF signals) of the wireless keyboard or mouse before the computer enters the Windows OS (e.g. under the DOS or BIOS mode). After the wireless keyboard or mouse recovers its Bluetooth function, the system is automatically switched back to the Bluetooth transmissions.

Figure 6:
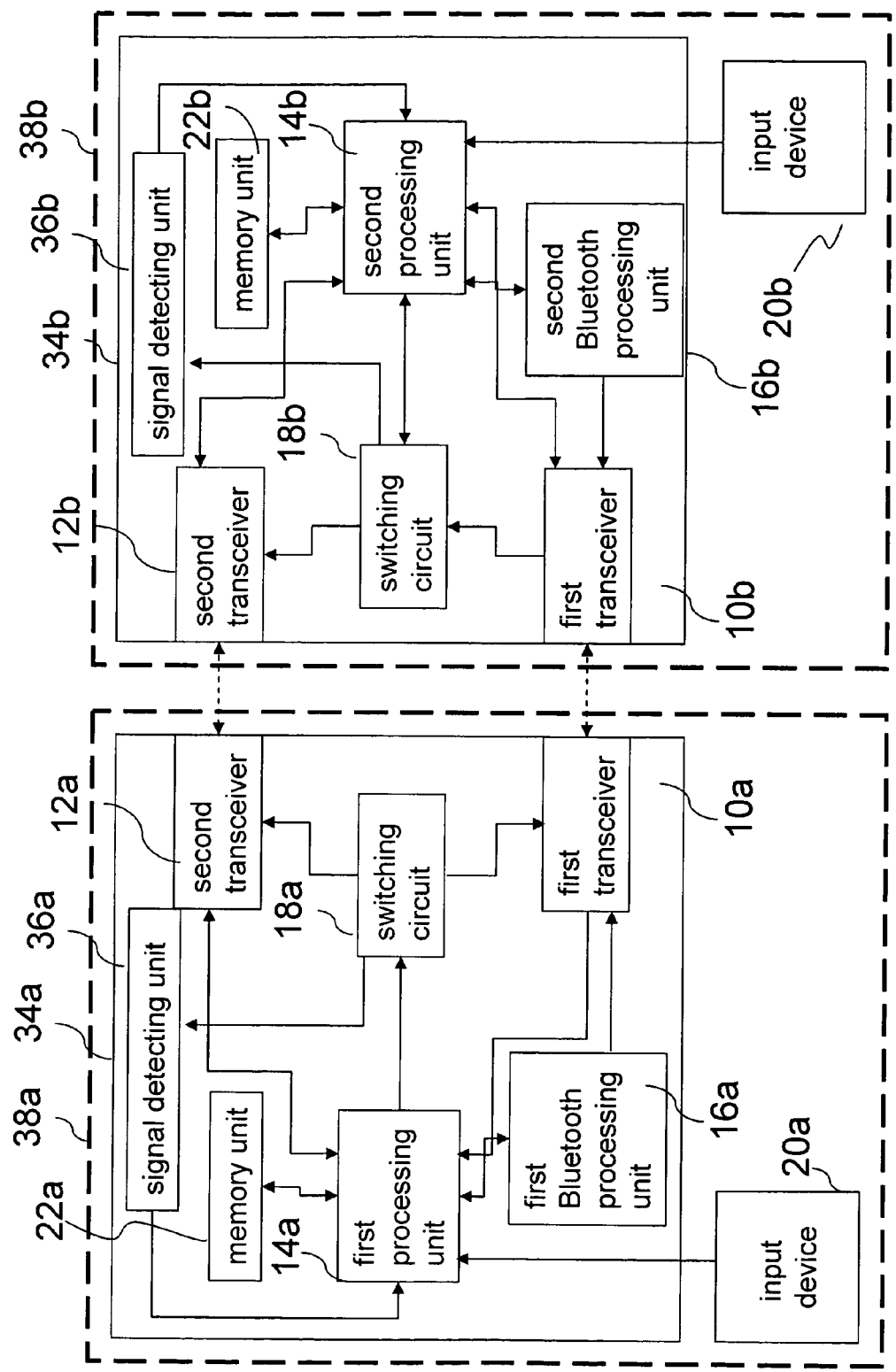
FIG. 6 is the system structure of another preferred embodiment of the invention.

As shown in FIG. 6, the system of yet another embodiment 34 of the invention has a first wireless transmission device 38a using the disclosed first wireless transmission module 34a and a second wireless transmission device 38b using the disclosed second wireless transmission module 34b. The first wireless transmission device 38a and the second wireless transmission device 38b can transmit data in a wireless means. The wireless transmission device can be a wireless keyboard, a wireless mouse, a cell phone, or a PDA.

For a wireless transmission module with the signal detecting unit installed in a wireless transmission devices, information mobile devices such as cell phones or PDA's, if the signal detecting unit (36a, 36b) finds that any of their wireless signals in the first frequency band is smaller than a predetermined threshold, the wireless transmission in the second frequency band is started so that the information mobile devices (38a, 38b) can still communicate. Likewise, if their wireless signals in the first frequency band are greater than the predetermined threshold, the information mobile devices (38a, 38b) switch from the wireless transmission in the second frequency band back to that in the first frequency band.

The wireless signal in the first frequency band described can be the Bluetooth signal or the 27 MHz RF signal, while the wireless signal in the first frequency band described can be the 27 MHz RF signal or the Bluetooth signal.

In summary, when the disclosed wireless transmission module is installed on a wireless information device, the wireless transmission is automatically switched to a second frequency band when the transmission in the first frequency band is unavailable. Once the wireless transmission in the first frequency band becomes available, the information devices automatically switch back. Therefore, the invention has a comprehensive coverage in wireless transmissions.

When the disclosed wireless transmission module is coupled to a computer peripheral input device, such as a wireless keyboard or mouse, the input device can use its wireless transmission in the second frequency band to communicate with a computer system installed with the disclosed wireless transmission module before the transmission in the first frequency band (such as the Bluetooth function) is available. Therefore, the wireless keyboard or mouse with the Bluetooth function can have a comprehensive coverage in wireless transmissions.

Certain variations would be apparent to those skilled in the art, which variations are considered within the spirit and scope of the claimed invention.

What is claimed is:

1. A wireless transmission module, comprising:
   a first transceiver, which is used to broadcast and to receive wireless signals in a first frequency band;
   a second transceiver, which is used to broadcast and to receive wireless signals in a second frequency band;
   a switching circuit, which is used to provide a single path of transmission and to control switching between the first transceiver and the second transceiver;
   a processing unit, which is used to control the switching circuit to switch the path of transmission from the first transceiver to the second transceiver when using the first frequency band of signal to communicate with a wireless device is not possible, and a cutting signal is generated to control the switching circuit to switch the path of transmission from the first transceiver to the second transceiver; and
   a signal detecting unit to detect the wireless signal in the first frequency band sent by the first transceiver and to notify the processing unit when the wireless signal in the first frequency band is detected to be smaller than a predetermined threshold.

2. The wireless transmission module of claim 1, wherein the wireless signal in the first frequency band is a 27 MHz radio frequency (RF) signal and the wireless signal in the second frequency band is a Bluetooth RF signal.

3. The wireless transmission module of claim 1, wherein the wireless signal in the first frequency band is a Bluetooth RF signal and the wireless signal in the second frequency band is a 27 MHz RF signal.

4. A wireless peripheral input device of a data processing unit, comprising:
   a peripheral input device, which contains arrayed keys to generate a corresponding signal for each of the keys or a track ball to generate a corresponding signal for each action; and
   a wireless transmission module, which is coupled to the input device, for transmitting each signal in a wireless means, and a data processing device, wherein the wireless transmission module contains:
   a first transceiver used to broadcast and to receive signals in a first frequency band;
   a second transceiver used to broadcast and to receive signals in a second frequency band;
   a switching circuit used to provide a single path of transmission and to control the its switches between the first transceiver and the second transceiver; and
   a processing unit used to control the switching circuit to switch the path of transmission from the first transceiver to the second transceiver when using the first frequency band of signal to communicate with a wireless device is not possible.

5. The wireless peripheral input device of a data processing unit as in claim 4, wherein when the processing unit determines that using the first frequency band of signal to communicate with a wireless device is not possible a cutting signal is generated to control the switching circuit to switch the path of transmission from the first transceiver to the second transceiver.

6. The wireless peripheral input device of a data processing unit as in claim 4 further comprising a signal detecting unit to detect the wireless signal in the first frequency band sent by the first transceiver and to notify the processing unit when the wireless signal in the first frequency band is detected to be smaller than a predetermined threshold.

7. The wireless peripheral input device of a data processing unit as in claim 4, wherein the wireless signal in the first frequency band is a 27 MHz RF signal and the wireless signal in the second frequency band is a Bluetooth RF signal.

8. The wireless peripheral input device of a data processing unit as in claim 4, wherein the wireless signal in the first frequency band is a Bluetooth RF signal and the wireless signal in the second frequency band is a 27 MHz RF signal.

9. A wireless data processing device, comprising:
   a peripheral input device of a data processing device with a first wireless transmission module, wherein the first wireless transmission module contains:
   a first transceiver used to broadcast and to receive signals in a first frequency band;
   a second transceiver used to broadcast and to receive signals in a second frequency band; and
   a switching circuit used to provide a single path of transmission and to control switching between the first transceiver and the second transceiver; and
   a data processing device with a second wireless transmission module, wherein the second wireless transmission module contains:
   a first transceiver used to broadcast and to receive signals in a first frequency band;
   a second transceiver used to broadcast and to receive signals in a second frequency band;

a signal detecting unit to detect wireless signals emitted by the first transceiver in the first frequency band and to notify the processing unit when the detect wireless signal is smaller than a predetermined value; and wherein when the processing unit determines that using the first frequency band of signal to communicate with a wireless device is not possible a cutting signal is generated to control the switching circuit to switch the path of transmission from the first transceiver to the second transceiver.

10. The wireless data processing device of claim 9, wherein the wireless signal in the first frequency band is a 27 MHz RF signal and the wireless signal in the second frequency band is a Bluetooth RF signal.

11. The wireless data processing device of claim 9, wherein the wireless signal in the first frequency band is a Bluetooth RF signal and the wireless signal in the second frequency band is a 27 MHz RF signal.

12. A wireless transmission method for wireless data transmissions between a wireless transmission module of a wireless peripheral input device and a data processing device, wherein the method contains the steps of:

initiating a wireless signal transmission in a first frequency band between the wireless transmission module and the data processing device;

returning a response signal when the wireless signal in the first frequency band is smaller than a predetermined value;

generating a cutting signal according to the response signal; and switching the wireless signal transmission in the first frequency band to a wireless signal transmission in the second frequency band according to the cutting signal.

13. The method of claim 12, wherein the wireless signal in the first frequency band is a 27 MHz RF signal and the wireless signal in the second frequency band is a Bluetooth RF signal.

14. The method of claim 12, wherein the wireless signal in the first frequency band is a Bluetooth RF signal and the wireless signal in the second frequency band is a 27 MHz RF signal.

* * * * *